(12) United States Patent
Kasahara

(10) Patent No.: US 10,696,150 B2
(45) Date of Patent: Jun. 30, 2020

(54) VEHICLE DRIVE APPARATUS

(71) Applicant: Honda Motor Co., Ltd., Tokyo (JP)

(72) Inventor: Takahiro Kasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/392,547

(22) Filed: Apr. 23, 2019

(65) Prior Publication Data

US 2019/0344652 A1 Nov. 14, 2019

(30) Foreign Application Priority Data

May 8, 2018 (JP) ................................ 2018-090006

(51) Int. Cl.

| B60K 6/20 | (2007.10) |
|---|---|
| B60K 6/26 | (2007.10) |
| B60K 6/383 | (2007.10) |
| B60K 6/40 | (2007.10) |
| H02K 7/00 | (2006.01) |
| H02K 7/08 | (2006.01) |
| H02K 7/108 | (2006.01) |

(Continued)

(52) U.S. Cl.
CPC ............... *B60K 6/26* (2013.01); *B60K 6/383* (2013.01); *B60K 6/40* (2013.01); *H02K 7/006* (2013.01); *H02K 7/083* (2013.01); *H02K 7/108* (2013.01); *H02K 7/116* (2013.01); *B60K 6/365* (2013.01); *B60K 6/445* (2013.01); *B60Y 2200/92* (2013.01); *B60Y 2400/427* (2013.01); *B60Y 2400/60* (2013.01); *F16H 3/727* (2013.01)

(58) Field of Classification Search
CPC . B60K 6/26; B60K 6/40; B60K 6/383; B60K 6/445; B60K 6/365; B60K 6/20; H02K 7/116; H02K 7/108; H02K 7/083; H02K 7/006; H02K 7/1815; H02K 7/18; H02K 7/10; H02K 7/08; H02K 7/1807; H02K 51/00; H02K 16/00; F16H 3/727; F16H 3/44; F16H 3/72
See application file for complete search history.

(56) References Cited

U.S. PATENT DOCUMENTS 6,896,080 B2 * 5/2005 Takenaka ................ B60L 50/16
180/65.235
6,998,757 B2 * 2/2006 Seguchi .................. F02N 11/04
310/114

(Continued)

FOREIGN PATENT DOCUMENTS

JP 2017114305 A 6/2017

*Primary Examiner* — James M Dolak
(74) *Attorney, Agent, or Firm* — Duft & Bornsen, PC

(57) ABSTRACT

A vehicle drive apparatus including a first rotating shaft driven by torque from a driving source, a second rotating shaft disposed around the first rotating shaft, a motor-generator including a rotor, a first rotor fitted on the first rotating shaft through a first fitting portion, a second rotor fitted on the second rotating shaft through a second fitting portion and fitted in a shaft of the rotor through a third fitting portion, a first and second bearings rotatably supporting the second rotating shaft and the shaft of the rotor, and a one-way clutch disposed in an inward side of the rotor and between the first and second bearings. A radial gap at the first fitting portion is larger than a radial gap at the second fitting portion, and is larger than a radial gap at the third fitting portion.

6 Claims, 10 Drawing Sheets

(51) Int. Cl.
　　　*H02K 7/116*　　　(2006.01)
　　　*F16H 3/72*　　　(2006.01)
　　　*B60K 6/365*　　　(2007.10)
　　　*B60K 6/445*　　　(2007.10)

(56) References Cited

U.S. PATENT DOCUMENTS

| | | | | |
|---|---|---|---|---|
| 7,033,296 | B2* | 4/2006 | Takenaka | B60K 6/26 |
| | | | | 475/5 |
| 7,569,970 | B2* | 8/2009 | Iwata | H02K 21/029 |
| | | | | 310/114 |
| 8,004,138 | B2* | 8/2011 | Iwata | H02K 1/276 |
| | | | | 310/114 |
| 8,453,817 | B2* | 6/2013 | Schrage | B60K 6/26 |
| | | | | 192/48.611 |
| 8,636,091 | B2* | 1/2014 | Sanji | B60K 6/26 |
| | | | | 180/65.23 |
| 8,997,956 | B2* | 4/2015 | Iwase | B60K 6/26 |
| | | | | 192/3.26 |
| 9,068,638 | B2* | 6/2015 | Iwase | B60K 6/26 |
| 9,214,848 | B2* | 12/2015 | Yamaguchi | H02K 11/225 |
| 9,266,419 | B2* | 2/2016 | Iwase | H02K 5/225 |
| 9,528,436 | B2* | 12/2016 | Kasuya | F02B 63/04 |
| 9,950,605 | B2* | 4/2018 | Suyama | B60K 6/387 |

* cited by examiner

|  |  | BR | CL | OWY | ENG |
|---|---|---|---|---|---|
| EV MODE | | × | × | × | × |
| W MOTOR MODE | | × | ○ | ○ | × |
| SERIES MODE | | ○ | ○ | × | ○ |
| HV MODE | LOW | × | ○ | ○ | ○ |
|  | HIGH | ○ | × | ○ | ○ |

EV MODE

W MOTOR MODE

SERIES MODE

HV LOW MODE

HV HIGH MODE

VEHICLE DRIVE APPARATUS

CROSS-REFERENCE TO RELATED APPLICATION

This application is based upon and claims the benefit of priority from Japanese Patent Application No. 2018-090006 filed on May 8, 2018, the content of which is incorporated herein by reference.

BACKGROUND OF THE INVENTION

Field of the Invention

This invention relates to a vehicle drive apparatus driving a hybrid vehicle or the like.

Description of the Related Art

Conventionally, there is a known apparatus of this type that includes a one-way clutch installed radially inward of a rotor of a motor-generator and a gear connected to the rotor of the motor-generator through a connection member and installed sideways of the motor-generator. Such an apparatus is described, for example, in Japanese Unexamined Patent Publication No. 2017-114305 (JP2017-114305A). In the apparatus described in JP2017-114305A, engine motive power input through an input shaft is transmitted to the gear through the one-way clutch and connection member.

However, in the apparatus described in JP2017-114305A, durability of the one-way clutch is apt to be impaired by repeated action on the one-way clutch of radial reaction force received by the gear.

SUMMARY OF THE INVENTION

An aspect of the present invention is a vehicle drive apparatus including: a driving source; a first rotating shaft extended about an axial line in an axial direction so as to be driven by a torque output from the driving source; a second rotating shaft formed in a substantially cylindrical shape about the axial line, disposed around the first rotating shaft, and including a gear portion on an outer peripheral surface thereof to output a driving force; a motor-generator disposed on a side of the gear portion and including a rotor formed in a substantially cylindrical shape about the axial line and a stator disposed around the rotor; a first rotor fitted on the first rotating shaft through a first fitting portion to rotate integrally with the first rotating shaft; a second rotor fitted on the second rotating shaft through a second fitting portion and fitted in a shaft of the rotor of the motor-generator through a third fitting portion to rotate integrally with the second rotating shaft and the rotor of the motor-generator; a first and second bearings disposed apart from each other in the axial direction on the side of the gear portion to rotatably support the second rotating shaft and the shaft of the rotor of the motor-generator; and a one-way clutch disposed in an inward side of the rotor of the motor-generator in a radial direction and between the first and second bearings in the axial direction to allow a relative rotation of the first rotor relative to the second rotor in a first direction and to prohibit the relative rotation in a second direction. A gap between the first rotating shaft and the first rotor in the radial direction at the first fitting portion is larger than a gap between the second rotating shaft and the second rotor in the radial direction at the second fitting portion, and is larger than a gap between the second rotor and the shaft of the rotor of the motor-generator in the radial direction at the third fitting portion.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
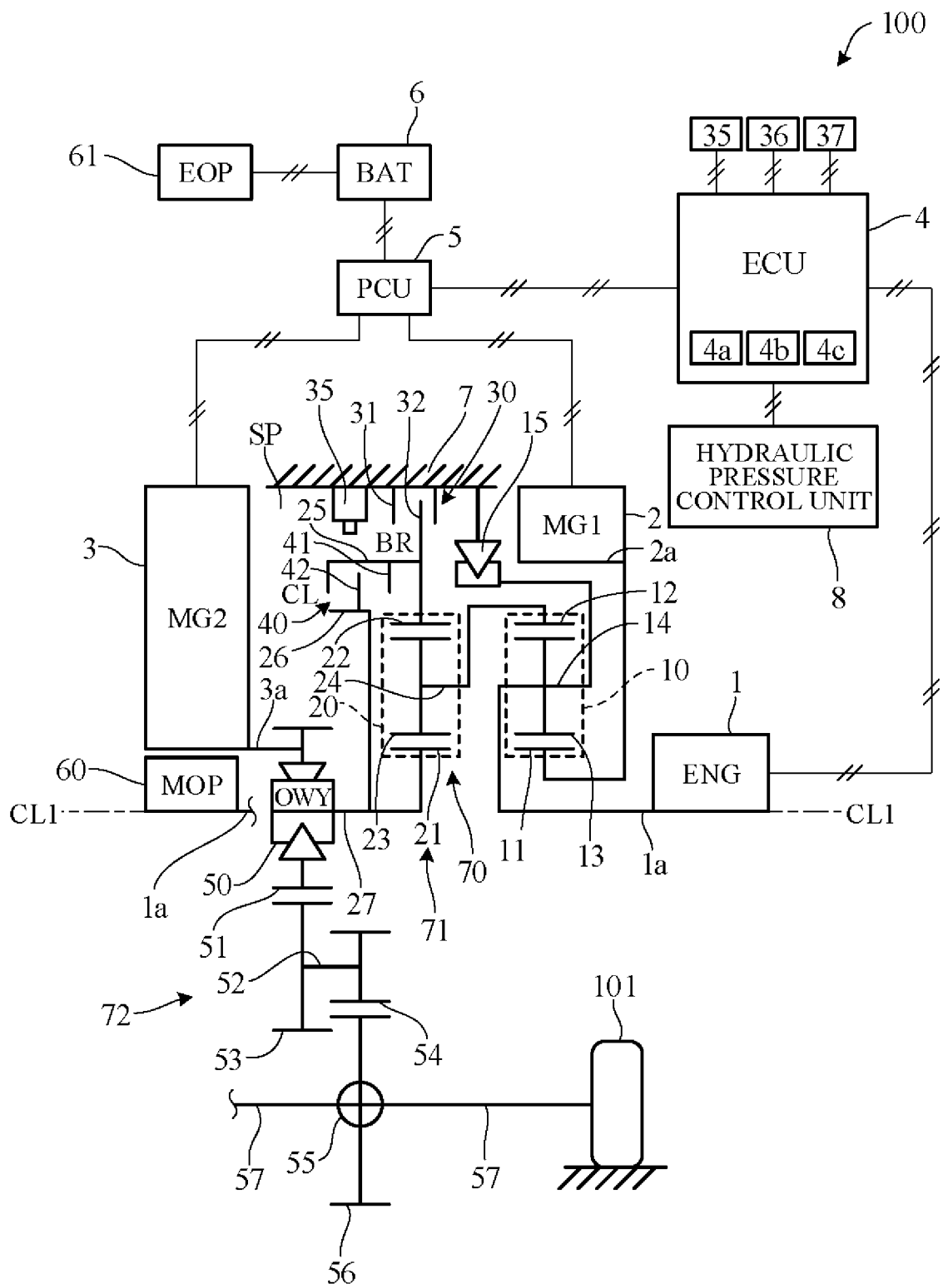
FIG. 1 is a diagram showing schematically a configuration overview of a vehicle drive apparatus according to an embodiment of the invention.

Hereinafter, an embodiment of the present invention is explained with reference to FIGS. 1 to 11. A vehicle drive apparatus according to an embodiment of the present invention is applied to a hybrid vehicle including an engine and a motor-generator as a drive power source. FIG. 1 is a diagram showing schematically a configuration overview of a vehicle drive apparatus 100 according to the present embodiment.

As shown in FIG. 1, the vehicle drive apparatus (vehicle drive unit) 100 includes an engine (ENG) 1, first and second motor-generators (MG1 and MG2) 2 and 3, a first planetary gear mechanism 10 for dividing motive power, and a second planetary gear mechanism 20 for changing speed ratio. The vehicle drive apparatus 100 is mounted at front of a vehicle, and motive power of the vehicle drive apparatus 100 is transmitted to front wheels 101. The vehicle is thus structured as a front-wheel-drive (i.e., FF layout) vehicle.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Throttle valve opening, quantity of fuel injected from the injector (injection time and injection time period) and ignition time are, inter alia, controlled by a controller (ECU) 4. An output shaft 1a of the engine 1 extends centered on axis (axial line) CL1.

The first and second motor-generators 2 and 3 each has a substantially cylindrical rotor centered on axis CL1 and a substantially cylindrical stator installed around the rotor and can function as a motor and as a generator. Namely, the rotors of the first and second motor-generators 2 and 3 are driven by electric power supplied from a battery 6 through a power control unit (PCU) 5 to coils of the stators. In such case, the first and second motor-generators 2 and 3 function as motors.

On the other hand, when rotating shafts 2a and 3a of rotors of the first and second motor-generators 2 and 3 are driven by external forces, the first and second motor-generators 2 and 3 generate electric power that is applied through the power control unit 5 to charge the battery 6. In such case, the first and second motor-generators 2 and 3 function as generators. During normal vehicle traveling, such as during cruising or acceleration, for example, the first motor-generator 2 functions chiefly as a generator and the second motor-generator 3 functions chiefly as a motor. The power control unit 5 incorporates an inverter controlled by instructions from the controller 4 so as to individually control output torque or regenerative torque of the first motor-generator 2 and the second motor-generator 3.

The first motor-generator 2 and the second motor-generator 3 are coaxially installed at spaced locations. The first motor-generator 2 and second motor-generator 3 are, for example, housed in a common case 7, and a space SP between them is enclosed by the case 7. Optionally, the first motor-generator 2 and second motor-generator 3 can be housed in separate cases.

The first planetary gear mechanism 10 and second planetary gear mechanism 20 of single pinion type are installed in the space SP between the first motor-generator 2 and second motor-generator 3. Specifically, the first planetary gear mechanism 10 is situated on the side of the first motor-generator 2 and the second planetary gear mechanism 20 on the side of the second motor-generator 3.

The first planetary gear mechanism 10 includes a first sun gear 11 and a first ring gear 12 installed around the first sun gear 11, both of which rotate around axis CL1, multiple circumferentially spaced first pinions (planetary gears) 13 installed between the first sun gear 11 and first ring gear 12 to mesh with these gears 11 and 12, and a first carrier 14 that supports the first planetary gears 13 to be individually rotatable around their own axes and collectively revolvable around axis CL1.

Similarly to the first planetary gear mechanism 10, the second planetary gear mechanism 20 includes a second sun gear 21 and a second ring gear 22 installed around the second sun gear 21, both of which rotate around axis CL1, multiple circumferentially spaced second pinions (planetary gears) 23 installed between the second sun gear 21 and second ring gear 22 to mesh with these gears 21 and 22, and a second carrier 24 that supports the second planetary gears 23 to be individually rotatable around their own axes and collectively revolvable around axis CL1.

The output shaft 1a of the engine 1 is connected to the first carrier 14, and power of the engine 1 is input to the first planetary gear mechanism 10 through the first carrier 14. On the other hand, when the engine 1 is started, power from the first motor-generator 2 is input to the engine 1 through the first planetary gear mechanism 10. The first carrier 14 is connected to a one-way clutch 15 provided on an inner peripheral surface of a surrounding wall of the case 7. The one-way clutch 15 allows forward rotation of the first carrier 14, i.e., rotation in same direction as that of the engine 1, and prohibits reverse rotation. Provision of the one-way clutch 15 prevents the engine 1 from being reversely rotated by reverse torque acting through the first carrier 14.

The first sun gear 11 is connected to the rotating shaft 2a of the rotor of the first motor-generator 2, and the first sun gear 11 and first motor-generator 2 (rotor) rotate integrally. The first ring gear 12 is connected to the second carrier 24, and the first ring gear 12 and second carrier 24 rotate integrally. Owing to this configuration, the first planetary gear mechanism 10 can output power received from the first carrier 14 through the first sun gear 11 to the first motor-generator 2 and output power through the first ring gear 12 to the second carrier 24 on an axle (drive shaft) 57 side. In other words, it can dividedly output power from the engine 1 to the first motor-generator 2 and the second planetary gear mechanism 20.

An axis CL1-centered substantially cylindrical outer drum 25 is provided radially outside the second ring gear 22. The second ring gear 22 is connected to and rotates integrally with the outer drum 25. A brake mechanism 30 is provided radially outward of the outer drum 25. The brake mechanism 30 is, for example, structured as a multi-plate wet brake including multiple radially extending plates (friction members) 31 arranged in axial direction and multiple radially extending disks (friction members) 32 arranged in axial direction (multiple illustration is omitted in the drawing). The plates 31 and disks 32 are alternately arranged in axial direction. In other words, the brake mechanism 30 includes plates 31 and disks 32 as a plurality of friction engagement elements.

The multiple plates 31 are circumferentially non-rotatably and axially movably engaged at their radial outer ends with the inner peripheral surface of the surrounding wall of the case 7. The multiple disks 32 rotate integrally with the outer drum 25 owing to their radially inner ends being engaged with outer peripheral surface of the outer drum 25 to be circumferentially non-rotatable and axially movable relative to the outer drum 25. A non-contact rotational speed sensor 35 for detecting rotational speed of the outer drum 25 is provided on inner peripheral surface of the case 7 to face outer peripheral surface of the outer drum 25 axially sideward of the brake mechanism 30.

The brake mechanism 30 includes a spring (not shown) for applying biasing force acting to separate the plates 31 and disks 32 and thus release the disks 32 from the plates 31, and a piston (not shown) for applying pushing force acting against the biasing force of the spring to engage the plates 31 and disks 32. The piston is driven by hydraulic pressure supplied through a hydraulic pressure control unit 8. In a state with no hydraulic pressure acting on the piston, the plates 31 and disks 32 separate, thereby releasing (turning OFF) the brake mechanism 30 and allowing rotation of the second ring gear 22. On the other hand, when hydraulic pressure acts on the piston, the plates 31 and disks 32 engage, thereby operating (turning ON) the brake mechanism 30. In this state, rotation of the second ring gear 22 is prevented.

An axis CL1-centered substantially cylindrical inner drum 26 is provided radially inward of and facing the outer drum 25. The second sun gear 21 is connected to a rotating shaft 27 of a second planetary gear mechanism 20 that extends along axis CL1 and is connected to the inner drum 26, whereby the second sun gear 21, rotating shaft 27 and inner drum 26 rotate integrally. A clutch mechanism 40 is provided between the outer drum 25 and the inner drum 26.

The clutch mechanism 40 is, for example, structured as a multi-plate wet clutch including multiple radially extending plates (friction members) 41 arranged in axial direction and multiple radially extending disks (friction members) 42 arranged in axial direction (multiple illustration is omitted in the drawing). The plates 41 and disks 42 are alternately arranged in axial direction. In other words, the clutch mechanism 40 includes plates 41 and disks 42 as a plurality of friction engagement elements.

The multiple plates 41 rotate integrally with the outer drum 25 owing to their radial outer ends being engaged with the inner peripheral surface of the outer drum 25 to be circumferentially non-rotatable and axially movable relative to the outer drum 25. The multiple disks 42 rotate integrally with the inner drum 26 owing to their radially inner ends being engaged with outer peripheral surface of the inner drum 26 to be circumferentially non-rotatable and axially movable relative to the inner drum 26.

The clutch mechanism 40 includes a spring (not shown) for applying biasing force acting to separate the plates 41 and disks 42 and thus release the disks 42 from the plates 41, and a piston (not shown) for applying pushing force acting against the biasing force of the spring to engage the plates 41 and disks 42. The piston is driven by hydraulic pressure supplied through the hydraulic pressure control unit 8.

In a state with no hydraulic pressure acting on the piston, the plates 41 and disks 42 separate, thereby releasing (turning OFF) the clutch mechanism 40 and allowing relative rotation of the second sun gear 21 with respect to the second ring gear 22. When rotation of the second ring gear 22 is prevented by the brake mechanism 30 being ON at this time, rotation of the rotating shaft 27 with respect to the second carrier 24 is accelerated. This state corresponds to speed ratio stage being shifted to high.

On the other hand, when hydraulic pressure acts on the piston, the plates 41 and disks 42 engage, thereby operating (turning ON) the clutch mechanism 40 and integrally joining the second sun gear 21 and second ring gear 22. When rotation of the second ring gear 22 is allowed by the brake mechanism 30 being OFF at this time, the rotating shaft 27 becomes integral with the second carrier 24 and rotates at the same speed as the second carrier 24. This state corresponds to speed ratio stage being shifted to low.

The second planetary gear mechanism 20, brake mechanism 30 and clutch mechanism 40 configure a speed change mechanism 70 that shifts rotation of the second carrier 24 between two speed stages (high and low) and outputs the shifted rotation from the rotating shaft 27. Torque transmission path from the first planetary gear mechanism 10 to the rotating shaft 27 of upstream of the one-way clutch 50 through the speed change mechanism 70 configures a first power transmission path 71.

The rotating shaft 27 is connected through a one-way clutch 50 to an output gear 51 centered on axis CL1. The one-way clutch 50 allows forward rotation of the output gear 51 with respect to the rotating shaft 27, i.e., relative rotation corresponding to vehicle forward direction, and prohibits rotation corresponding to vehicle reverse direction. In other words, when rotational speed of the rotating shaft 27 corresponding to vehicle forward direction is faster than rotational speed of the output gear 51, the one-way clutch 50 locks, whereby the rotating shaft 27 and output gear 51 rotate integrally. On the other hand, when rotational speed of the output gear 51 corresponding to vehicle forward direction is faster than rotational speed of the rotating shaft 27, the one-way clutch 50 disengages (unlocks), whereby the output gear 51 freely rotates with respect to the rotating shaft 27 without torque pulled back.

A rotating shaft 3a of the rotor of the second motor-generator 3 is connected to the output gear 51, so that the output gear 51 and the second motor-generator 3 (rotating shaft 3a) rotate integrally. Since the one-way clutch 50 is interposed between the rotating shaft 27 and the rotating shaft 3a, forward relative rotation of the rotating shaft 3a with respect to the rotating shaft 27 is allowed. In other words, when rotational speed of the second motor-generator 3 is faster than rotational speed of the rotating shaft 27, the second motor-generator 3 efficiently rotates without torque of the rotating shaft 27 (second planetary gear mechanism 20) pulled back. The one-way clutch 50 is installed radially inward of the rotating shaft 3a. Since axial length of the vehicle drive apparatus 100 can therefore be minimized, a smaller vehicle drive apparatus 100 can be realized.

A mechanical oil pump (MOP) 60 is installed radially inward of the rotor of the second motor-generator 3. The mechanical oil pump 60 is connected to the output shaft 1a of the engine 1 and driven by the engine 1. Oil supply necessary when the engine 1 is stopped is covered by driving an electric oil pump (EOP) 61 with power from the battery 6.

A large-diameter gear 53 rotatable around a counter shaft 52 lying parallel to axis CL1 meshes with the output gear 51, and torque is transmitted to the counter shaft 52 through the large-diameter gear 53. Torque transmitted to the counter shaft 52 is transmitted through a small-diameter gear 54 to a ring gear 56 of a differential unit 55 and further transmitted through the differential unit 55 to the left and right axles (drive shaft) 57. Since this drives the front wheels 101, the vehicle travels. The rotating shaft 3a, output gear 51, large-diameter gear 53, small-diameter gear 54 and differential unit 55, inter alia, configure a second power transmission path 72 as a torque transmission path from the one-way clutch 50 to the axles 57. The first and second power transmission paths 71 and 72 are connected with each other in series.

The controller (ECU) 4 as an electric control unit incorporates an arithmetic processing unit having a CPU, ROM, RAM and other peripheral circuits, and the CPU includes an engine control ECU 4a, a speed change mechanism control ECU 4b and a motor-generator control ECU 4c. Alternatively, the multiple ECUs 4a to 4c need not be incorporated in the single controller 4 but can instead be provided as multiple discrete controllers 4 corresponding to the ECUs 4a to 4c.

The controller 4 receives as input signals from, inter alia, the rotational speed sensor 35 for detecting rotational speed of the outer drum 25, a vehicle speed sensor 36 for detecting vehicle speed, and an accelerator opening angle sensor 37 for detecting accelerator opening angle indicative of amount of accelerator pedal depression. Although not indicated in the drawings, the controller 4 also receives signals from a sensor for detecting rotational speed of the engine 1, a sensor for detecting rotational speed of the first motor-generator 2 and a sensor for detecting rotational speed of the second motor-generator 3.

The controller 4 includes a mode instruction unit for deciding and instructing a drive mode in accordance with a predefined driving force map representing vehicle driving force characteristics defined in terms of factors such as vehicle speed and accelerator opening angle, based on input signals from these sensors. In order to enable the vehicle to travel in the drive mode instructed from the mode instruction unit, the controller 4 controls operation of the engine 1, first and second motor-generators 2 and 3, the brake mechanism 30 and the clutch mechanism 40 by outputting control signals to, inter alia, an actuator for regulating throttle valve opening, an injector for injecting fuel, the power control unit 5 and the hydraulic pressure control unit 8.

Figures 2, 3:
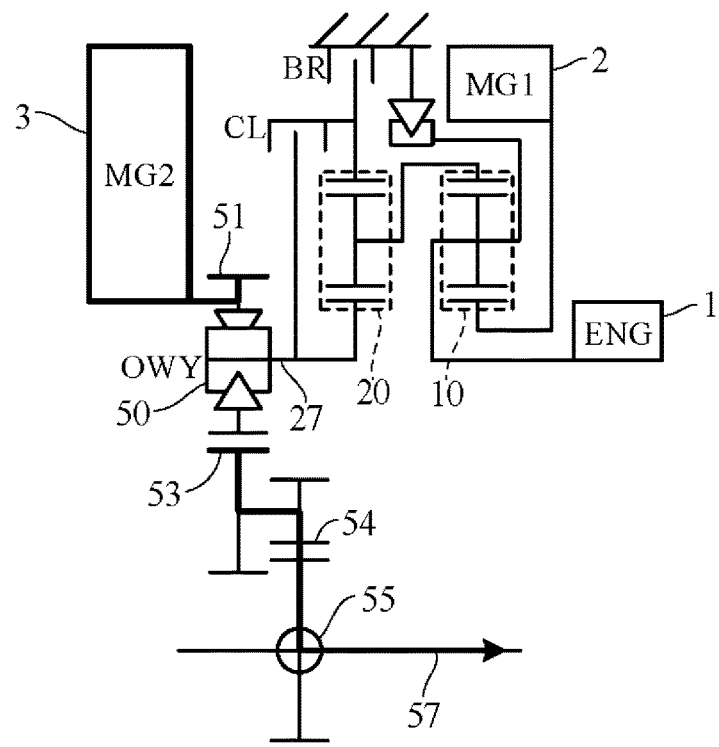
FIG. 2 is a diagram an example of drive modes implemented by the vehicle drive apparatus according to the embodiment of the invention.
FIG. 3 is a skeleton diagram showing a flow of torque transmission in EV mode in the vehicle drive apparatus of FIG. 1.

FIG. 2 is a table showing examples of some drive modes that can be implemented by the vehicle drive apparatus 100 according to this embodiment of the present invention, along with operating states of the brake mechanism (BR) 30, clutch mechanism (CL) 40, one-way clutch (OWY) 50 and engine (ENG) 1 corresponding to the different modes.

In FIG. 2, EV mode, W motor mode (double motor mode), series mode and HV mode are shown as typical drive modes. HV mode is subdivided into low mode (HV low mode) and high mode (HV high mode). In the drawing, brake mechanism 30 ON (Engaged), clutch mechanism 40 ON (Engaged), one-way clutch 50 Locked, and engine 1 Operating are indicated by symbol "o", while brake mechanism 30 OFF (Disengaged), clutch mechanism 40 OFF (Disengaged), one-way clutch 50 Unlocked, and engine 1 Stopped are indicated by symbol "x".

In EV mode, the vehicle is driven for traveling solely by motive power of the second motor-generator 3. As shown in FIG. 2, in EV mode, the brake mechanism 30 and clutch mechanism 40 are both OFF, and the engine 1 is stopped, in accordance with instructions from the controller 4. FIG. 3 is a skeleton diagram showing flow of torque transmission in EV mode.

As show in FIG. 3, in EV mode, torque output from the second motor-generator 3 is transmitted through the output gear 51, large-diameter gear 53, small-diameter gear 54 and differential unit 55 to the axles 57. At this time, the rotating shaft 27 stays stopped under action of the one-way clutch 50 and efficient vehicle running can be achieved without torque pulled back (rotational resistance) attributable to rotating elements upstream of the second motor-generator 3 (on second planetary gear mechanism side).

Figure 4:
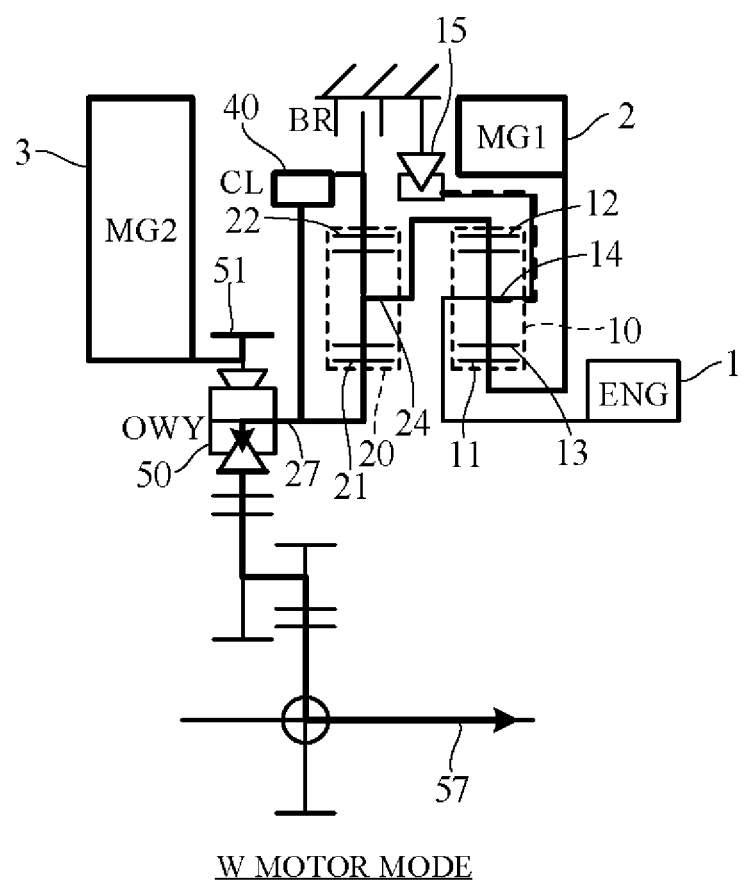
FIG. 4 is a skeleton diagram showing a flow of torque transmission in W motor mode in the vehicle drive apparatus of FIG. 1.

In W motor mode, the vehicle is driven for traveling by motive power of the first motor-generator 2 and the second motor-generator 3. As shown in FIG. 2, in W motor mode, the brake mechanism 30 is OFF, the clutch mechanism 40 is ON and the engine 1 is stopped, in accordance with instructions from the controller 4. FIG. 4 is a skeleton diagram showing flow of torque transmission in W motor mode.

As show in FIG. 4, in W motor mode, rotation of the first carrier 14 is prevented by action of the one-way clutch 15, and torque output from the first motor-generator 2 is transmitted through the first sun gear 11, first planetary gears 13, first ring gear 12, second carrier 24 (second carrier 24 rotating integrally with the second sun gear 21 and second ring gear 22) to the rotating shaft 27. Torque transmitted to the rotating shaft 27 is transmitted through the locked one-way clutch 50 to the output gear 51, and transmitted to the axles 57 together with torque output from the second motor-generator 3. Since torque from the first motor-generator 2 and second motor-generator 3 is applied to the axles 57 in this manner in W motor mode (double motor mode), propelling force can be increased to greater than in EV mode. In W motor mode, generating electric by the first motor-generator 2 is not implemented. Therefore, W motor mode is implemented when state of charge of the battery 6 (SOC) is greater than or equal to predetermined value.

Figure 5:
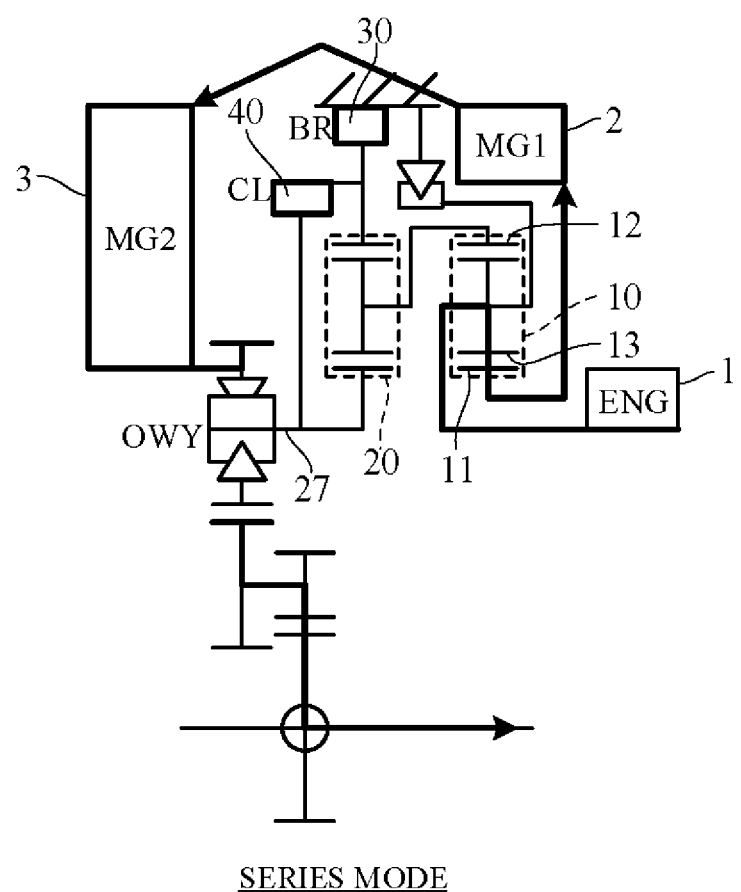
FIG. 5 is a skeleton diagram showing a flow of torque transmission in series mode in the vehicle drive apparatus of FIG. 1.

In series mode, the vehicle is driven for traveling by motive power of the second motor-generator 3 while the first motor-generator 2 is being driven by motive power from the engine 1 to generate electric power. As shown in FIG. 2, in series mode, the brake mechanism 30 and clutch mechanism 40 are both ON and the engine 1 is operated, in accordance with instructions from the controller 4. FIG. 5 is a skeleton diagram showing flow of torque transmission in series mode.

As shown in FIG. 5, in series mode, rotation from the first ring gear 12 to as far as the rotating shaft 27 is stopped, so that all power output from the engine 1 is input through the first planetary gears 13 and first sun gear 11 to the rotor rotating shaft 2a of the first motor-generator 2. The first motor-generator 2 is therefore driven to generate electric power and this generated electric power is used to drive the second motor-generator 3, whereby the vehicle can travel. In other words, an electrical path is structured for supplying electrical energy generated by the first motor-generator 2 to the second motor-generator 3, whereby running of the vehicle is driven by the second motor-generator 3. In series mode, as in EV mode, pull back of torque is prevented by action of the one-way clutch 50.

In HV mode, the vehicle is driven for traveling by motive power produced by the engine 1 and the second motor-generator 3. Within the HV mode, the HV low mode corresponds to a mode of wide-open acceleration from low speed, and the HV high mode corresponds to a mode of normal traveling after EV traveling. As shown in FIG. 2, in HV low mode, the brake mechanism 30 is OFF, the clutch mechanism 40 is ON and the engine 1 is operated, in accordance with instructions from the controller 4. In HV high mode, the brake mechanism 30 is ON, the clutch mechanism 40 is OFF and the engine 1 is operated, in accordance with instructions from the controller 4.

Figure 6:
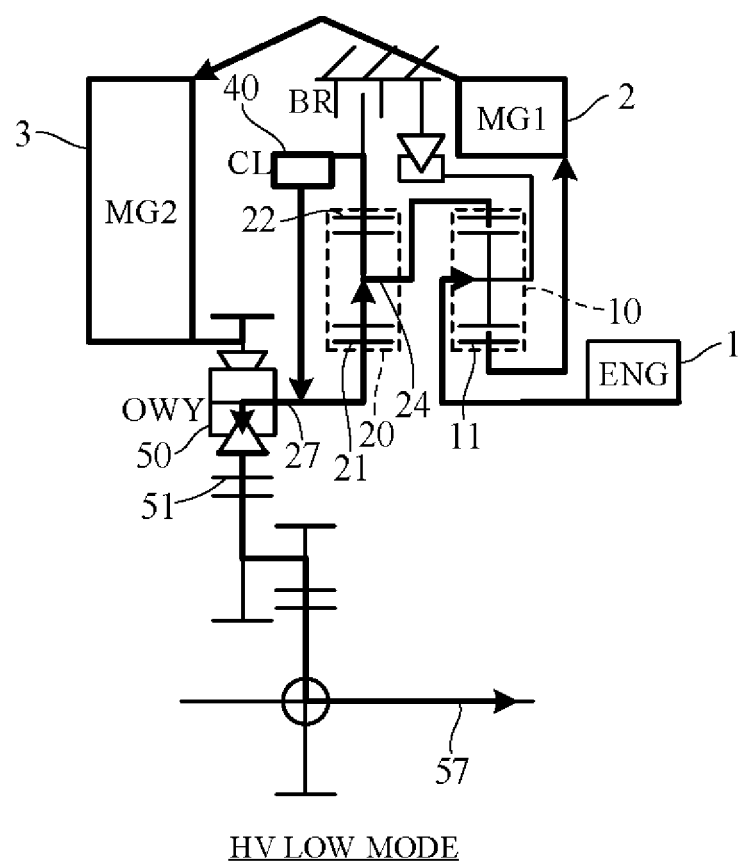
FIG. 6 is a skeleton diagram showing a flow of torque transmission in HV low mode in the vehicle drive apparatus of FIG. 1.

FIG. 6 is a skeleton diagram showing flow of torque transmission in HV low mode. As shown in FIG. 6, in HV low mode, some torque output from the engine 1 is transmitted through the first sun gear 11 to the first motor-generator 2. As a result, the battery 6 is charged by power generated by the first motor-generator 2, and, in addition, driving electric power is supplied from the battery 6 to the second motor-generator 3.

In HV low mode, remainder of torque output from the engine 1 is transmitted through the first ring gear 12 and the second carrier 24 (second carrier 24 rotating integrally with the second sun gear 21 and second ring gear 22) to the rotating shaft 27. Rotational speed of the rotating shaft 27 at this time is equal to rotational speed of the second carrier 24. Torque transmitted to the rotating shaft 27 is transmitted through the locked one-way clutch 50 to the output gear 51, and transmitted to the axles 57 together with torque output from the second motor-generator 3. This enables high-torque vehicle running using torque from the engine 1 and second motor-generator 3, while maintaining sufficient battery residual charge with power generated by the first motor-generator 2.

Figure 7:
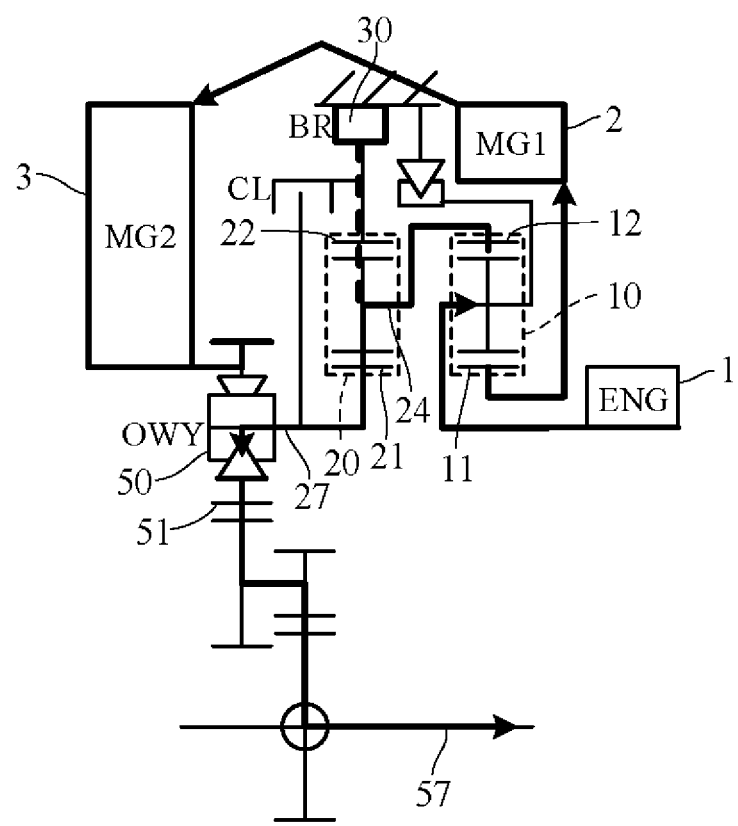
FIG. 7 is a skeleton diagram showing a flow of torque transmission in HV high mode in the vehicle drive apparatus of FIG. 1.

FIG. 7 is a skeleton diagram showing flow of torque transmission in HV high mode. As shown in FIG. 7, in HV high mode, similarly to in HV low mode, some torque output from the engine 1, for example, is transmitted through the first sun gear 11 to the first motor-generator 2. Remainder of torque output from the engine 1 is transmitted through the first ring gear 12, second carrier 24 and second sun gear 21 to the rotating shaft 27. Rotational speed of the rotating shaft 27 at this time is greater than rotational speed of the second carrier 24.

Torque transmitted to the rotating shaft 27 is transmitted through the locked one-way clutch 50 to the output gear 51, and transmitted to the axles 57 together with torque output from the second motor-generator 3. Therefore, by utilizing torque from the engine 1 and second motor-generator 3 while maintaining sufficient battery residual charge, vehicle running can be achieved at torque that, while lower than that in HV low mode, is higher than that in EV mode. Since rotation of the rotating shaft 27 is speeded up by the second planetary gear mechanism 20 in HV high mode, running at lower engine speed than in HV low mode can be realized.

Figure 8:
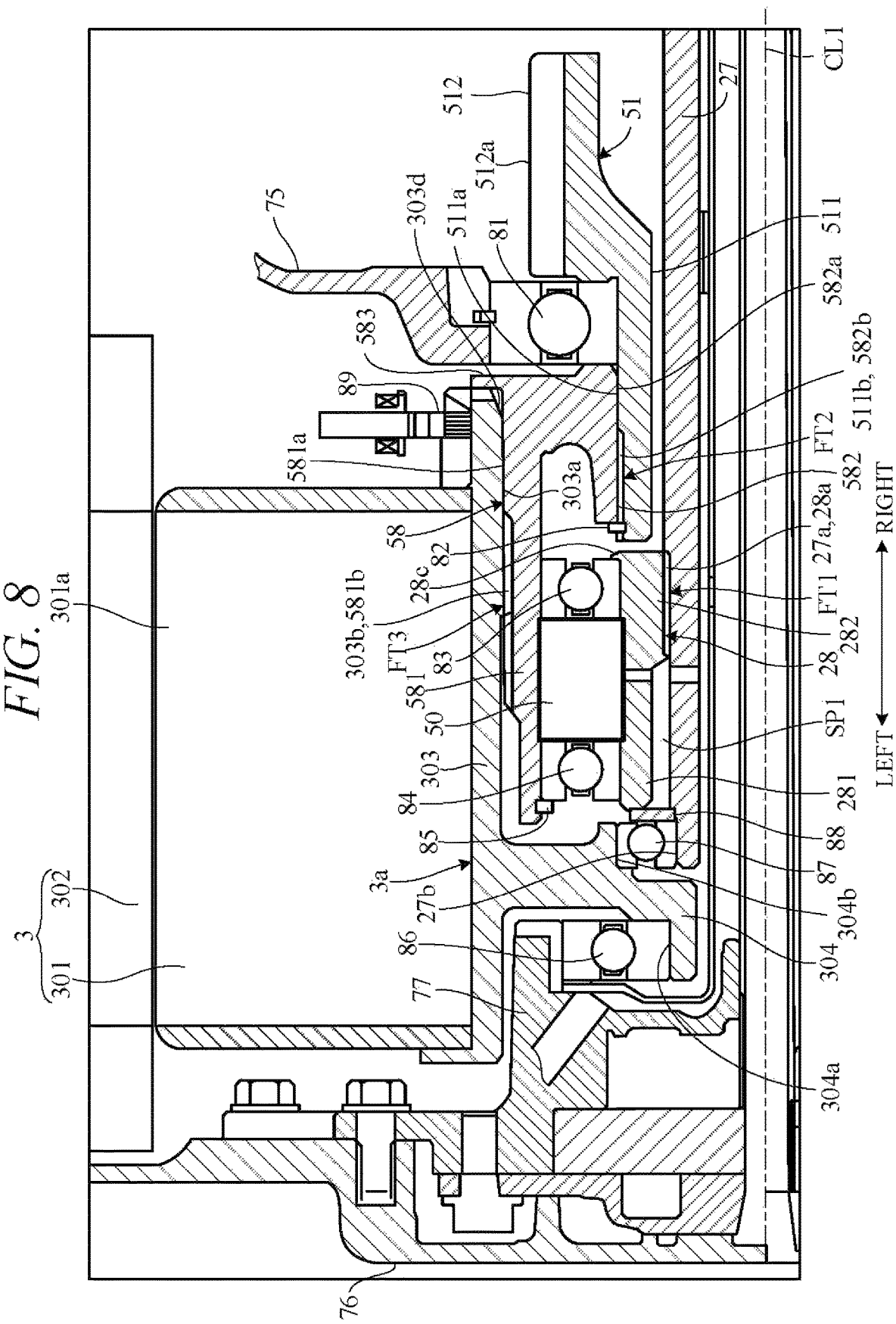
FIG. 8 is a cross-sectional diagram showing main components of the vehicle drive apparatus according to the embodiment of the invention.
Figure 9:
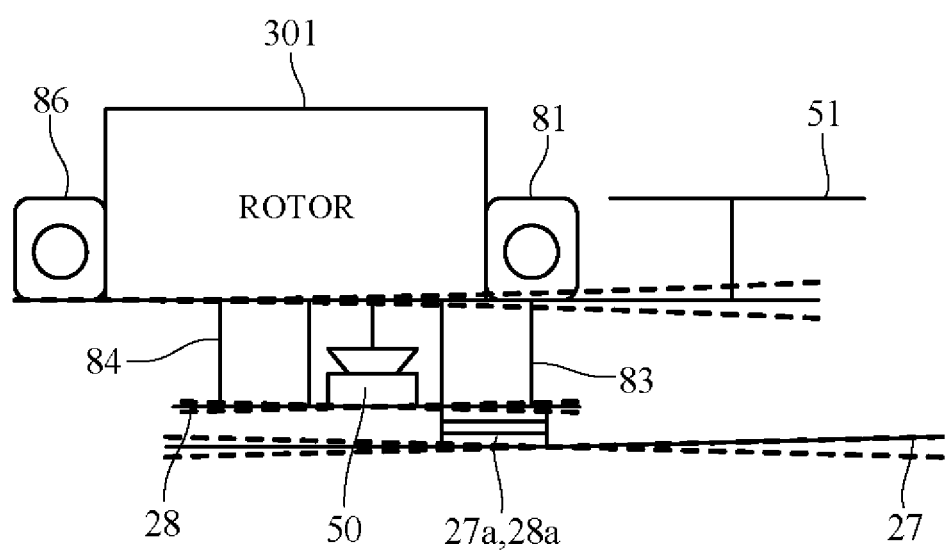
FIG. 9 is a diagram for explaining an action of the vehicle drive apparatus according to the embodiment of the invention.

There now follows a detailed explanation of the main components of the vehicle drive apparatus 100 configured as described above. FIG. 8 is a cross-sectional diagram showing main components of the vehicle drive apparatus 100, particularly detailed structural features of components constituting a power transmission path from the rotating shaft 27 to the output gear 51 of FIG. 1. For convenience of explanation in the following, lateral (left-right) direction is defined as direction parallel to axis CL1 in the drawing, and structural components are explained using this definition. Since torque output from the rotating shaft 27 of the second planetary gear mechanism 20 is input to the one-way clutch 50, the rotating shaft 27 is sometimes called an input shaft in the following.

As shown in FIG. 8, the input shaft 27 is of substantially cylindrical shape centered on axis CL1, and splines 27a are formed on outer peripheral surface of left end portion of the input shaft 27. Although not illustrated, the second sun gear 21 of the second planetary gear mechanism 20 is formed on outer peripheral surface of right end portion of the input shaft 27. A rotating shaft 28 of shorter length than the input shaft 27 is fitted on the splines 27a. The rotating shaft 28 has axis CL1-centered substantially cylindrical shaft portions 281 and 282 positioned left and right adjacently in mentioned order, diameter of inner peripheral surface of the shaft portion 281 is formed larger than inner peripheral surface of the shaft portion 282, and a substantially cylindrical space SP1 is formed between inner peripheral surface of the shaft portion 281 and outer peripheral surface of the input shaft 27. Outer peripheral surface of the rotating shaft 28 is cylindrically formed seamlessly across the shaft portion 281 and shaft portion 282, i.e., with no level change between the shaft portions 281 and 282.

Splines 28a are formed on inner peripheral surface of the shaft portion 282, and the input shaft 27 and rotating shaft 28 are coupled with the splines 27a and 28a in fitted state. Where the input shaft 27 and rotating shaft 28 are coupled by mating of the splines 27a and 28a is called first coupling (first fitting portion) FT1. When the input shaft 27 and rotating shaft 28 are in fitted state, right end portion of the rotating shaft 28 abuts end portion of the splines 27a, so that axial position (rightward movement) of the rotating shaft 28 is restricted, while left end portion of the input shaft 27 projects leftward beyond left end portion of the rotating shaft 28. Either the splines 27a or the splines 27a, e.g., the splines 27a of the input shaft 27, are crowned. Since the input shaft 27 and rotating shaft 28 are coupled by mating the splines 27a and 28a, degree of radial direction restraint between the input shaft 27 and rotating shaft 28 is small, so that backlash can develop in the first coupling FT1.

The one-way clutch 50 is installed radially outward of the rotating shaft 28. In addition, a rotor 301 of the second motor-generator 3 is installed radially outward of the one-way clutch 50, and a stator 302 is installed radially outward of the rotor 301. The rotor 301 has a rotor core 301a fitted on outer peripheral surface of the rotating shaft 3a. The rotating shaft (rotor rotating shaft) 3a of the rotor 301 has an axis CL1-centered substantially cylindrical shaft portion 303 and a bearing support 304 extending radially inward from inner peripheral surface of the shaft portion 303.

The output gear 51 is installed at right side of the rotating shaft 28. The output gear 51 is provided continuously with an axis CL1-centered substantially cylindrical shaft 511 on its left side and an axis CL1-centered substantially cylindrical shaft 512 on its right side. Left end surface of the shaft 511 faces right end surface of the rotating shaft 28 across a gap. Outer peripheral surface of the shaft 512 is formed to larger diameter than outer peripheral surface of the shaft 511, and a gear 512a that meshes with the large-diameter gear 53 (FIG. 1) is formed on outer peripheral surface of right portion of the shaft 512.

An intermediate shaft 58 is interposed between the shaft portion 303 of the rotor rotating shaft 3a and the shaft 511 of the output gear 51. The intermediate shaft 58 has an axis CL1-centered substantially cylindrical shaft portion (first shaft portion) 581 and a shaft portion (second shaft portion) 582 of shorter length than the shaft portion 581 located radially inward of the shaft portion 581. Right end portion of the shaft portion 581 and right end portion of the shaft portion 582 are interconnected, and the shaft portion 581 projects farther leftward than the shaft portion 582.

An axis CL1-centered cylindrical surface 582a is formed at right end portion of inner peripheral surface of the shaft portion 582 of the intermediate shaft 58, and splines 582b are formed at left side of the cylindrical surface 582a. An axis CL1-centered cylindrical surface 511a is formed at right end portion of outer peripheral surface of the shaft 511 of the output gear 51, and splines 511b are formed at left side of the cylindrical surface 511a. The cylindrical surface 582a and cylindrical surface 511a are of approximately same diameter, and the cylindrical surface 582a is snugly fitted (e.g., press-fitted) on the cylindrical surface 511a. The splines 582b and splines 511b are engaged at this time to be capable of torque transmission. Where the output gear 51 and intermediate shaft 58 are coupled through the cylindrical surfaces 511a, 582a and splines 511b, 582b is called second coupling (second fitting portion) FT2.

A ball bearing 81 is installed on outer peripheral surface of the shaft 511 of the output gear 51 between right end surface of the intermediate shaft 58 and left end surface of the shaft 512 of the output gear 51. An inner ring of the ball bearing 81 is fitted on outer peripheral surface of the shaft 511, and opposite left and right end faces of the inner ring respectively abut right end surface of the intermediate shaft 58 and left end surface of the shaft 512. A snap ring 82 is attached to left end portion of outer peripheral surface of the shaft 511 of the output gear 51. The snap ring 82 abuts left end portion of the shaft portion 582, thereby defining axial position of the output gear 51 relative to the intermediate shaft 58. An outer ring of the ball bearing 81 is fitted in inner peripheral surface of a support plate 75 forming part of the case 7. As a result, the output gear 51 comes to be rotatably supported by the case 7 (support plate 75) through the ball bearing 81. The support plate 75 is bolted to the case 7, which is integral with a left side wall 76.

An axis CL1-centered cylindrical surface 581a is formed at right end portion of outer peripheral surface of the shaft portion 581, and splines 581b are formed at left side of the cylindrical surface 581a. An axis CL1-centered cylindrical surface 303a is formed at right end portion of inner peripheral surface of the shaft portion 303 of the rotor rotating shaft 3a, and splines 303b are formed at left side of the cylindrical surface 303a. Axial length of the splines 581b is longer than axial length of the splines 303*b*. The cylindrical surface 581*a* and cylindrical surface 303*a* are of approximately same diameter, and the cylindrical surface 581*a* is snugly fitted (e.g., press-fitted) on the cylindrical surface 303*a*. The splines 581*b* and splines 303*b* are engaged at this time to be capable of torque transmission. Where the rotor rotating shaft 3*a* and intermediate shaft 58 are coupled through the cylindrical surfaces 303*a*, 581*a* and splines 303*b*, 581*b* is called third coupling (third fitting portion) FT3. In fitted state of the rotor rotating shaft 3*a* and intermediate shaft 58, a protrusion 583 of the intermediate shaft 58 protruding radially outward beyond the cylindrical surface 581*a* abuts right end surface of the shaft portion 303 of the rotor rotating shaft 3*a*, thereby defining axial position of the intermediate shaft 58 relative to the rotor rotating shaft 3*a*.

Thus the second coupling FT2 and the third coupling FT3 respectively have the cylindrical surfaces 511*a*, 582*a* and the cylindrical surfaces 303*a*, 581*a* that define radial positions of the output gear 51 and intermediate shaft 58 and the intermediate shaft 58 and rotor rotating shaft 3*a*, and, in addition, respectively have splines 511*b*, 582*b* and splines 303*b*, 581*b* for transmitting torque. As a result, the intermediate shaft 58, rotor rotating shaft 3*a* and output gear 51 can be integrally coupled via the second coupling FT2 and third coupling FT3.

The one-way clutch 50 is interposed between outer peripheral surface of the rotating shaft 28 and inner peripheral surface of the shaft portion 581 of the intermediate shaft 58. Although not illustrated in detail in the drawings, the one-way clutch 50 is configured as, for example, a sprag one-way clutch that has an inner ring, an outer ring and multiple sprags arranged circumferentially between the inner ring and outer ring and that is adapted to allow one-direction (first direction) transmission of torque from the inner ring through the sprags to the outer ring (locked state) and to prohibit transmission of torque in opposite direction (second direction), i.e., to allow free rotation of the inner ring with respect to the outer ring in opposite direction (unlocked state). The inner ring of the one-way clutch 50 is fixed to the rotating shaft 28 and the outer ring is fixed to the shaft portion 581 of intermediate shaft 58. Optionally, the rotating shaft 28 can be configured to serve as the inner ring of the one-way clutch 50 and the intermediate shaft 58 be configured to serve as its outer ring.

The torque transmission portion between the rotor rotating shaft 3*a* and the intermediate shaft 58, i.e., between the splines 303*b*, 581*b* of the third coupling FT3 and the torque transmission portion between the input shaft 27 and rotating shaft 28, i.e., between the splines 27*a*, 28*a* of the first coupling FT1, are positioned rightward of the one-way clutch 50, respectively. In locked state of the one-way clutch 50, radially inward side of the one-way clutch 50 is slightly deformed and radially outward side thereof greatly deformed, but effect on the splines of deformation difference between radially inward and radially outward sides of the one-way clutch 50 (spline damage and the like) is prevented by providing the torque transmission portions shifted axially rightward from the one-way clutch 50. The one-way clutch 50 is of approximately same diameter as the ball bearing 81 and is formed to large diameter. Amount of torque that can be transmitted by the one-way clutch 50 (torque capacity) can therefore be increased.

Ball bearing 83 is arranged on right side of the one-way clutch 50 and ball bearing 84 is arranged on left side of the one-way clutch 50. Inner peripheral surfaces of inner rings of the ball bearings 83 and 84 are fitted on outer peripheral surface of rotating shaft 28, and outer peripheral surfaces of outer rings thereof are fitted on inner peripheral surface of the shaft portion 581. Right end portion of the inner ring of the ball bearing 83 on right side abuts a protrusion 28*c* protruding radially outward from right end portion of outer peripheral surface of the rotating shaft 28, and left end portion of the outer ring of the ball bearing 84 on left side abuts end surface of a snap ring 85 engaged with inner peripheral surface of the shaft portion 581. This restricts axial direction positions of the ball bearings 83 and 84. Optionally, one or the other of the ball bearings 83 and 84 can be omitted.

Radially inward end portion of the bearing support 304 of the rotor rotating shaft 3*a* extends leftward and an axis CL1-centered cylindrical surface 304*a* is formed on outer peripheral surface of this extension. Inner peripheral surface of an inner ring of a ball bearing 86 is fitted on the cylindrical surface 304*a*. An outer ring of the ball bearing 86 is fitted on cylindrical surface of a bearing support member 77 bolted to the left side wall 76 of the case 7. As a result, the rotor rotating shaft 3*a* comes to be rotatably supported by the case 7 (left side wall 76) through the ball bearing 86.

A rightward projecting protrusion is provided on the bearing support 304, and an axis CL1-centered cylindrical surface 304*b* is formed on inner peripheral surface of the protrusion. An axis CL1-centered cylindrical surface 27*b* is formed on outer peripheral surface of left end portion of the input shaft 27, and a ball bearing 87 is interposed between the cylindrical surface 304*b* and the cylindrical surface 27*b*. In other words, inner peripheral surface of an inner ring of the ball bearing 87 fits on the cylindrical surface 27*b* and outer peripheral surface of an outer ring thereof fits on the cylindrical surface 304*b*. The cylindrical surface 27*b* is of smaller diameter than outer peripheral surface of the input shaft 27 rightward thereof, and a shim 88 of predetermined thickness is installed at a right end step of the cylindrical surface 27*b*. Left end surface of the rotating shaft 28 abuts right end surface of the shim 88. Left end surface of the outer ring of the ball bearing 87 abuts right end surface of the bearing support 304.

Although not illustrated, inner peripheral surface of right end portion of the input shaft 27 is rotatably supported through a bearing (e.g., roller bearing) on outer peripheral surface of the output shaft 1*a* of the engine 1 or a rotating shaft that rotates integrally with the output shaft 1*a*. In other words, the input shaft 27 is rotatably supported through a pair of left and right bearings (including ball bearing 87) from members (including rotor rotating shaft 3*a*) other than the rotating shaft 28. Torque is therefore transmitted between the input shaft 27 and rotating shaft 28 solely through the splines 27*a* and 28*a*, and radial gap of the first coupling FT1 is larger than radial gap of the second coupling FT2 and radial gap of the third coupling FT3.

In other words, the three elements on the power transmission path from the one-way clutch 50 to the output gear 51 (rotor rotating shaft 3*a*, intermediate shaft 58, and output gear 51) are integrally assembled via the cylindrical surfaces 303*a*, 581*a* and 511*a*, 582*a*, and are additionally rotatably supported by the pair of left and right ball bearings 86 and 81 via the cylindrical surfaces 304*a* and 511*a*. Since the cylindrical surfaces 303*a*, 581*a*, 511*a*, 582*a* and 304*a*, 511*a* are all coaxially formed centered on the axis CL1, radial reaction force received by the output gear 51 can be reliably supported by the ball bearings 81 and 86.

In contrast, the two elements on the power transmission path from the input shaft 27 to the one-way clutch 50 (input shaft 27 and rotating shaft 28) have large radial gaps owing to being coupled through the splines 27a and 28a. Therefore, as indicated by the structure of the power transmission path from the input shaft 27 to the output gear 51 schematically illustrated in FIG. 9, any radial deflection occurring in the output gear 51 (dashed line) is absorbed by the splines 27a and 28a. Therefore, since no difference in degree of deflection arises between the inner ring and outer ring of the one-way clutch 50, durability of the one-way clutch 50 is enhanced.

As shown in FIG. 8, a resolver 89 for detecting rotation of the rotor 301 is press-fitted at the outer peripheral surface of the right end portion of the shaft portion 303 of the rotor rotating shaft 3a. Right end portion of inner peripheral surface of the shaft portion 303 is chamfered (chamfer 303d), and the resolver 89 is positioned radially outward of the chamfer 303d. Since this minimizes effect of strain in the shaft portion 303 caused by press-fitting of the resolver 89, it ensures good coaxiality of the rotor rotating shaft 3a and intermediate shaft 58.

Figure 10:
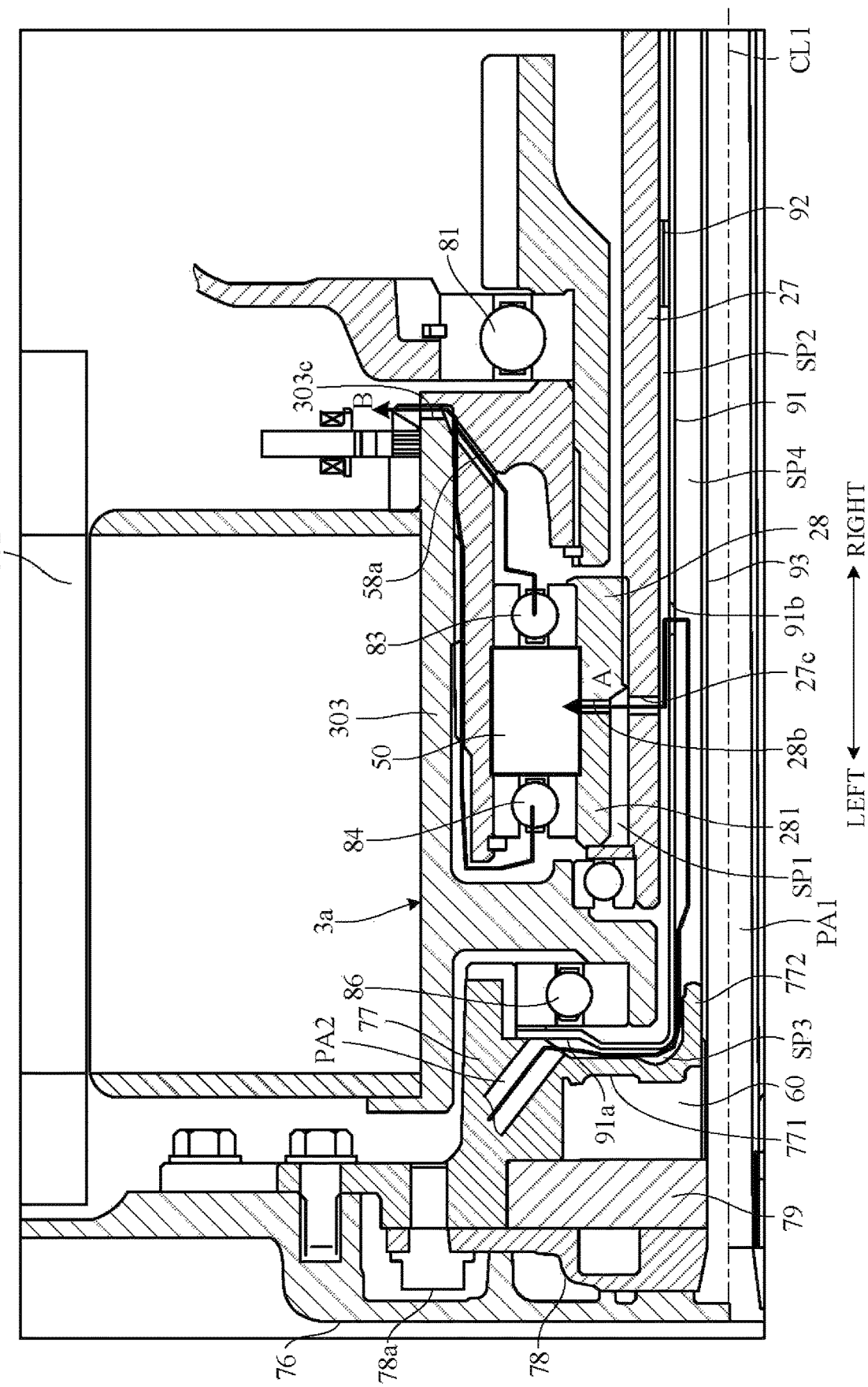
FIG. 10 is a drawing showing an oil flow in the vehicle drive apparatus of FIG. 8.

FIG. 10 is a clutch 50-centered drawing showing oil flow. As shown in FIG. 10, an axis CL1-centered substantially cylindrical intermediate pipe 91 is provided radially inward of the input shaft 27. Left end portion of the intermediate pipe 91 is bent radially outward, and a disk member 91a is formed on left end portion of the intermediate pipe 91. The disk member 91a is non-rotatably clamped between left end surface of the outer ring of the ball bearing 86 and right end surface of the bearing support member 77. The intermediate pipe 91 is supported by cantilevering with its right end portion remaining free (as a free end). A bush (bimetal) 92 is provided between the intermediate pipe 91 and input shaft 27 to be approximately coaxial with the ball bearing 81, and a space SP2 is formed leftward of the bush 92.

A first flow passage forming body 78 is attached to left end surface of the bearing support member 77 by bolts 78a, a second flow passage forming body 79 is attached to right surface of the first flow passage forming body 78, and the oil pump 60 is installed rightward of the second flow passage forming body 79. The second flow passage forming body 79 forms flow passages (not shown) for lubricating oil, coolant oil and other oils discharged from the oil pump 60 flowing in and oils flowing out to the oil pump 60. The first flow passage forming body 78 forms oil paths to an oil passage PA1 along the axis CL1 and to an oil passage PA2 provided in the bearing support member 77. Optionally, the first flow passage forming body 78 and second flow passage forming body 79 can be formed as a common member rather than as separate members.

The bearing support member 77 includes a disk member 771 extending radially inward so as to enclose upper and right sides of the oil pump 60 and, more radially inward than the intermediate pipe 91, includes an axis CL1-centered cylindrical member 772 extending rightward from radially inward end portion of the disk member 771. Since the disk member 771 and cylindrical member 772 are apart from the intermediate pipe 91, a space SP3 is formed between these members and the intermediate pipe 91. A connection pipe 93 is installed along the axis CL1 radially inward of the cylindrical member 772, and a space SP4 communicating with the space SP3 is formed between the connection pipe 93 and the intermediate pipe 91.

Right end portion of the connection pipe 93 is connected to the output shaft 1a of the engine, and the connection pipe 93 rotates together with the output shaft 1a. Left end portion of the connection pipe 93 is connected through splines provided on its outer peripheral surface with splines on inner peripheral surface of the oil pump 60, and the oil pump 60 rotates integrally with the connection pipe 93. Rotation of the output shaft 1a of the engine 1 is therefore transmitted through the connection pipe 93 to the oil pump 60. The oil passage PA1 lying parallel to the axis CL1 is formed inside the connection pipe 93.

Multiple circumferentially arranged through-holes 91b are formed in the intermediate pipe 91 leftward of the bush 92, and the radially outward space SP2 and the radially inward space SP4 communicate through the through-holes 91b. Multiple circumferentially arranged through-holes 28b are formed radially in the shaft portion 281 of the rotating shaft 28 at a position corresponding to axial middle of the one-way clutch 50, and the radially inward space SP1 and radially outward one-way clutch 50 communicate through the through-holes 28b. Multiple circumferentially arranged through-holes 27c are formed radially in the input shaft 27 at same axial position and same phase as the through-holes 28b, and the radially outward space SP1 and the radially inward space SP2 communicate through the through-holes 27c.

As indicated by arrow A of FIG. 10, lubricating oil discharged from the oil pump 60 is supplied to the one-way clutch 50 through the oil passage PA2 of the bearing support member 77, space SP3, space SP4, through-holes 91b, space SP2, through-holes 27c, space SP1, and through-holes 28b. As indicated by arrow B of FIG. 10, this lubricating oil is supplied as coolant oil to a winding and the like of the stator 302 through the ball bearing 83, through-holes 58a provided in the intermediate shaft 58, and a notch 303c in right end portion of the shaft portion 303 of the rotor rotating shaft 3a, or through the ball bearing 84, a space between the rotor rotating shaft 3a and intermediate shaft 58, and the notch 303c.

Figure 11:
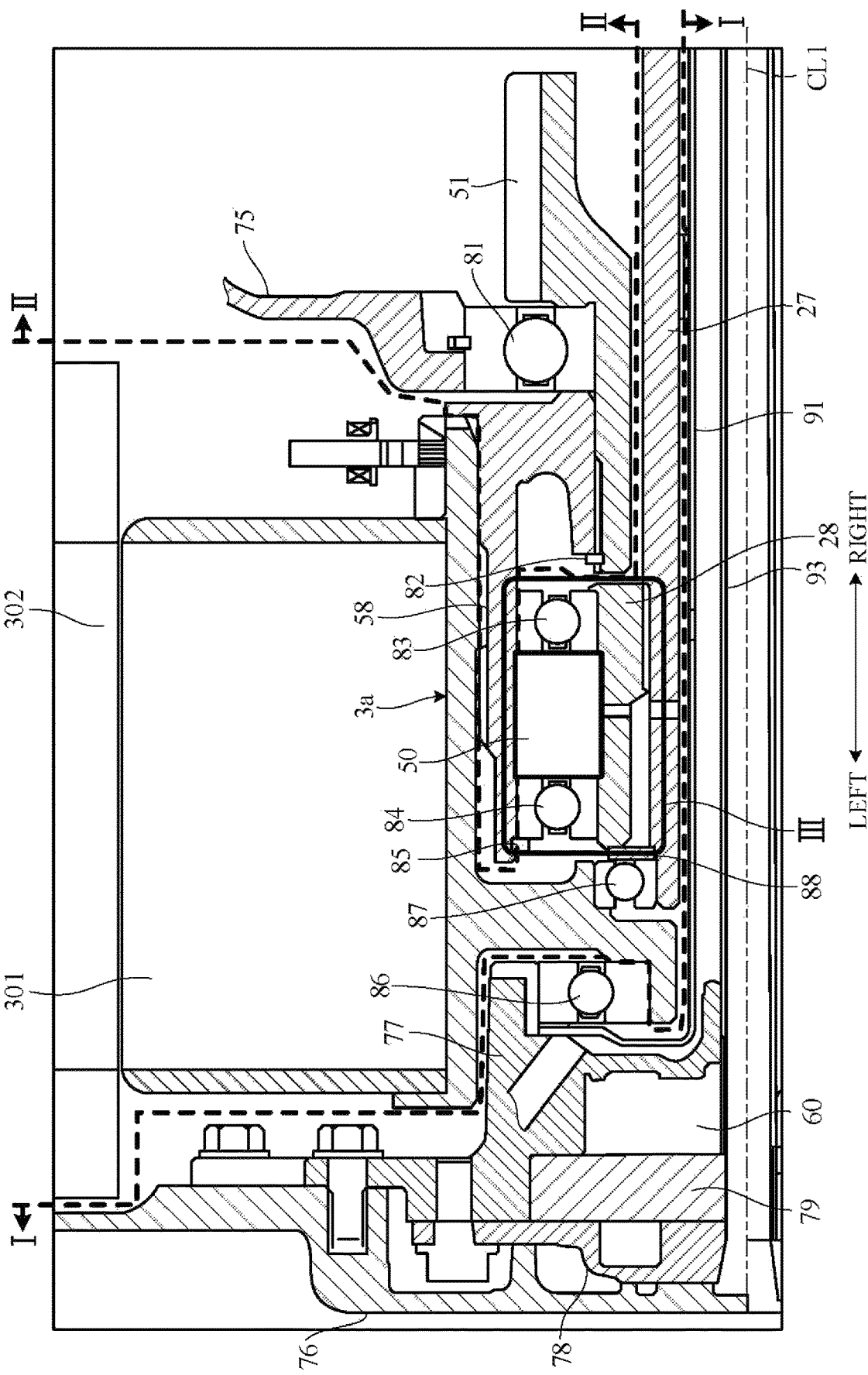
FIG. 11 is a diagram for explaining how to assemble the vehicle drive apparatus according to the embodiment of the invention.

Procedure for assembling main components of the aforesaid vehicle drive apparatus 100 is explained with reference to FIG. 11 in the following. First, components other than the connection pipe 93 in region of the dashed line connecting arrows I-I in FIG. 11 are assembled. Specifically, a subassembly (first subassembly) is formed by integrally assembling the left side wall 76 of the case 7, the bearing support member 77, the first flow passage forming body 78, the second flow passage forming body 79, the oil pump 60, the intermediate pipe 91, and the ball bearing 86. The rotor 301 and the ball bearing 87 are additionally incorporated in the first subassembly to obtain a second subassembly.

Next, components in region of the dashed line connecting arrows II-II in FIG. 11 are assembled. Specifically, a subassembly (third subassembly) is formed by integrally assembling the ball bearing 81, the output gear 51, the intermediate shaft 58, and the snap ring 82 with the support plate 75 not yet bolted to the case 7. In addition, components surrounded by the dashed line III in FIG. 11 are assembled with the third assembly. Specifically, the one-way clutch 50, the rotating shaft 28, the ball bearings 83 and 84, and the snap ring 85 are integrally assembled with the intermediate shaft 58 to obtain a subassembly (fourth subassembly).

Next, following assembly of the stator 302 with the fourth assembly, the fourth assembly and the second assembly are joined with the shim 88 sandwiched in between. Finally, the connection pipe 93 and the input shaft 27 are incorporated. By following the aforesaid procedure, the one-way clutch 50 can be installed radially inward of the rotor rotating shaft 3a, and the vehicle drive apparatus 100 can be easily assembled with the ball bearings 81 and 86 rotatably supporting the output gear 51 and rotor rotating shaft 3a installed on left and right sides of the one-way clutch 50.

The present embodiment can achieve advantages and effects such as the following:

(1) The vehicle drive apparatus 100 includes: the input shaft 27 centered on and extending along the axis CL1 to be driven by motive power input from the engine 1; the axis CL1-centered substantially cylindrical output gear 51 installed around the input shaft 27 and provided on its outer peripheral surface with the gear 512a for outputting vehicle driving force; the second motor-generator 3 installed sideways of the gear 512a and having the axis CL1-centered substantially cylindrical rotor 301 and the stator 302 installed around the rotor 301; the rotating shaft 28 fitted on the input shaft 27 through the first coupling FT1 to rotate integrally with the input shaft 27; the intermediate shaft 58 fitted on the output gear 51 through the second coupling FT2 and fitted in the rotor rotating shaft 3a through the third coupling FT3 to rotate integrally with the output gear 51 and the rotor 301; the ball bearings 81 and 86 installed sideways of the gear 512a at a distance from each other in axial direction to rotatably support the output gear 51 and the rotor rotating shaft 3a; and the one-way clutch 50 installed radially inward of the rotor 301 and between the ball bearing 81 and the ball bearing 86 in axial direction to allow rotation of the rotating shaft 28 relative to the intermediate shaft 58 in one direction and prohibit rotation thereof in opposite direction (FIGS. 1 and 8). In this vehicle drive apparatus 100, the input shaft 27 and the rotating shaft 28 are fitted through the splines 27a and 28a, while, in contrast, the output gear 51 and intermediate shaft 58, and the intermediate shaft 58 and rotor rotating shaft 3a, are coupled through the approximately equal diameter cylindrical surfaces 511a and 582a and the approximately equal diameter cylindrical surfaces 303a and 581a, respectively (FIG. 8). As a result, radial gap of the first coupling FT1 is larger than radial gap of the second coupling FT2 and radial gap of the second coupling FT3.

Radial deflection of the output gear 51 owing to reaction force received by the output gear 51 is therefore absorbed by backlash of the first coupling FT1 between the rotating shaft 28 and the input shaft 27. This ensures enhanced durability of the one-way clutch 50 because no difference in degree of deflection arises between the inner ring and outer ring of the one-way clutch 50. Moreover, the one-way clutch 50 is installed radially inward of the rotor 301 (rotor rotating shaft 3a), and the mutually fitted and integrated output gear 51, intermediate shaft 58 and rotor rotating shaft 3a are rotatably supported by the case 7 (support plate 75, bearing support member 77, etc.) through the ball bearings 81 and 86 installed on left and right sides of the one-way clutch 50. The one-way clutch 50 can therefore be enlarged to realize greater torque capacity without increasing axial direction length of the vehicle drive apparatus 100.

(2) The first coupling FT1 includes the axis CL1-centered splines 27a and 28a formed on outer peripheral surface of the input shaft 27 and inner peripheral surface of the rotating shaft 28, respectively. The second coupling FT2 includes the CL1-centered cylindrical surfaces 511a and 582a formed on outer peripheral surface of the shaft 511 of the output gear 51 and inner peripheral surface of the shaft portion 582 of the intermediate shaft 58, respectively, and the splines 511b and 582b adjacent to the cylindrical surfaces 511a and 582a. The third coupling FT3 includes the CL1-centered cylindrical surfaces 303a and 581a formed on inner peripheral surface of the shaft portion 303 of the rotor rotating shaft 3a and outer peripheral surface of the shaft portion 581 of the intermediate shaft 58, respectively, and the splines 303b and 581b adjacent to cylindrical surfaces 303a and 581a (FIG. 8). As a result, durability of the one-way clutch 50 can be enhanced and the vehicle drive apparatus 100 can be structured more compactly.

(3) The one-way clutch 50 is installed between outer peripheral surface of the rotating shaft 28 and inner peripheral surface of the shaft portion 581 formed in the intermediate shaft 58 (FIG. 8). The vehicle drive apparatus 100 further includes the ball bearings 83 and 84 installed sideways of the one-way clutch 50 and between outer peripheral surface of the rotating shaft 28 and inner peripheral surface of the shaft portion 581 for rotatably supporting the rotating shaft 28, and the ball bearing 87 for rotatably supporting the input shaft 27 independently of the rotating shaft 28 (FIG. 8). Since the rotating shaft 28 and the input shaft 27 are therefore supported by separate members, backlash for absorbing deflection of the output gear 51 can develop in the first coupling FT1.

Various modifications of the aforesaid embodiment are possible. Some examples are explained in the following. In the aforesaid embodiment, the input shaft 27 serving as a first rotating shaft and the rotating shaft 28 serving as a first rotor are fitted through the splines 27a and 28a, and the output gear 51 serving as a second rotating shaft and intermediate shaft 58 serving as a second rotor, and the intermediate shaft 58 and rotor rotating shaft 3a, are respectively fitted through the cylindrical surfaces 511a, 582a serving as a first cylindrical surface and second cylindrical surface, and the cylindrical surface 581a, 303a serving as a third cylindrical surface and fourth cylindrical surface. However, a first coupling (a first fitting portion), a second coupling (a second fitting portion) and a third coupling (a third fitting portion) can be of any configuration insofar as radial gap at the first fitting portion is larger than radial gap at the second fitting portion and radial gap at the third fitting portion. In the aforesaid embodiment, the gear 512a is formed to the output gear 51 serving as a gear portion for outputting a driving force. However, a gear portion is not limited to the aforesaid configuration.

In the aforesaid embodiment, the one-way clutch 50 is configured as a sprag clutch but a one-way clutch is not limited to this configuration. In the aforesaid embodiment, the pair of left and right ball bearings 81 and 86 are installed sideways of the gear 512a and on left and right sides of the one-way clutch 50. However, a first bearing and a second bearing are not limited to this configuration. In the aforesaid embodiment, the rotating shaft 28 is rotatably supported by the ball bearings 83 and 84 installed on left and right sides of the one-way clutch 50 and left and right sides of the ball bearings 81 and 86. However, a third bearing is not limited to this configuration. In the aforesaid embodiment, the input shaft 27 is rotatably supported by the rotor rotating shaft 3a through the ball bearing 87. However, insofar as a first rotating shaft (input shaft 27) is supported not through a first rotating body (rotating shaft 28), a fourth bearing is not limited to this configuration.

Although in the aforesaid embodiment, the input shaft 27 is driven by power from the engine 1, the input shaft can be driven by a torque output from other driving source. Therefore, the vehicle drive apparatus can be applied to a vehicle other than the hybrid vehicle.

The above embodiment can be combined as desired with one or more of the above modifications. The modifications can also be combined with one another.

According to the present invention, it is possible to enhance durability of a one-way clutch.

Above, while the present invention has been described with reference to the preferred embodiments thereof, it will be understood, by those skilled in the art, that various changes and modifications may be made thereto without departing from the scope of the appended claims.

What is claimed is:

1. A vehicle drive apparatus, comprising:
a driving source;
a first rotating shaft extended about an axial line in an axial direction so as to be driven by a torque output from the driving source;
a second rotating shaft formed in a substantially cylindrical shape about the axial line, disposed around the first rotating shaft, and including a gear portion on an outer peripheral surface thereof to output a driving force;
a motor-generator disposed on a side of the gear portion and including a rotor formed in a substantially cylindrical shape about the axial line and a stator disposed around the rotor;
a first rotor fitted on the first rotating shaft through a first fitting portion to rotate integrally with the first rotating shaft;
a second rotor fitted on the second rotating shaft through a second fitting portion and fitted in a shaft of the rotor of the motor-generator through a third fitting portion to rotate integrally with the second rotating shaft and the rotor of the motor-generator;
a first and second bearings disposed apart from each other in the axial direction on the side of the gear portion to rotatably support the second rotating shaft and the shaft of the rotor of the motor-generator; and
a one-way clutch disposed in an inward side of the rotor of the motor-generator in a radial direction and between the first and second bearings in the axial direction to allow a relative rotation of the first rotor relative to the second rotor in a first direction and to prohibit the relative rotation in a second direction, wherein
a gap between the first rotating shaft and the first rotor in the radial direction at the first fitting portion is larger than a gap between the second rotating shaft and the second rotor in the radial direction at the second fitting portion, and is larger than a gap between the second rotor and the shaft of the rotor of the motor-generator in the radial direction at the third fitting portion;
wherein the first fitting portion includes a spline on an outer peripheral surface of the first rotating shaft and a spline on an inner peripheral surface of the first rotor, formed about the axial line, respectively, the second fitting portion includes a first cylindrical surface and a spline adjacent to the first cylindrical surface on an outer peripheral surface of the second rotating shaft on the side of the gear portion and a second cylindrical surface and a spline adjacent to the second cylindrical surface on an inner peripheral surface of the second rotor, formed about the axial line, respectively, and the third fitting portion includes a third cylindrical surface and a spline adjacent to the third cylindrical surface on an outer peripheral surface of the second rotor and a fourth cylindrical surface and a spline adjacent to the fourth cylindrical surface on an inner peripheral surface of the shaft of the rotor of the motor-generator, formed about the axial line, respectively.

2. The apparatus according to claim 1, wherein
the first cylindrical surface is press-fitted in the second cylindrical surface and the third cylindrical surface is press-fitted in the fourth cylindrical surface.

3. The apparatus according to claim 1, wherein
the one-way clutch is disposed between an outer peripheral surface of the first rotor and an inner peripheral surface of a shaft portion of the second rotor, and
the apparatus further comprises:
a third bearing disposed on a side of the one-way clutch and between the outer peripheral surface of the first rotor and the inner peripheral surface of the shaft portion to rotatably support the first rotor; and
a fourth bearing configured to rotatably support the first rotating shaft not through the first rotor.

4. The apparatus according to claim 3, wherein
the shaft portion is a first shaft portion,
the second rotor further includes a second shaft portion in an inward side of the first shaft portion in the radial direction and on the side of the one-way clutch, and
the second cylindrical surface and the spline adjacent to the second cylindrical surface are formed in the inner peripheral surface of the second shaft portion.

5. The apparatus according to claim 3, wherein
the first rotating shaft is formed in a substantially cylindrical shape about the axial line, and
the first rotating shaft and the first rotor respectively include through holes in the radial direction on a side of the first fitting portion so as to lead a lubricant oil from an inner space of the first rotating shaft to the one-way clutch.

6. The apparatus according to claim 1, wherein
the first bearing is provided on an outer peripheral surface formed in a cylindrical shape about the axial line of the second rotating shaft, and the second bearing is provided on an outer peripheral surface formed in a cylindrical shape about the axial line of the shaft of the rotor of the motor-generator.

* * * * *